Patented May 8, 1934

1,957,858

UNITED STATES PATENT OFFICE 1,957,858

ANTHRAQUINONE DYESTUFFS

Berthold Stein, Mannheim, Germany, assignor to General Aniline Works, Inc., New York, N. Y., a corporation of Delaware No Drawing. Application August 18, 1931, Serial No. 557,943. In Germany August 30, 1930

3 Claims. (Cl. 260—59)

The present invention relates to anthraquinone dyestuffs suitable for dyeing wool and process of producing same.

It is known that, under the action of phenols, in the presence of strongly basic substances at high temperatures the halogen atoms in the β-halogenaminoanthraquinones become exchanged for phenoxy radicles. In this manner 1.4-diamino-2.3-diphenoxyanthraquinone is obtained from 1.4-diamino-2.3-dichloranthraquinone. It is also known that the halogen in β-halogenaminoanthraquinones can be replaced by sulpho groups under the action of sulphurous acid or its salts. In this manner 1.4-diaminoanthraquinone-2.3-disulphonic acid is formed from 1.4-diamino-2.3-dichloranthraquinone by heating, under pressure, with sodium sulphite in phenol.

I have now found that one atom of chlorine in the 1.4-diamino-2.3-dichloroanthraquinones can be replaced by a phenoxy radicle, and the other chlorine atom by the sulpho group concurrently in a single operation, by heating under atmospheric pressure these compounds with a phenol and a salt of sulphurous acid and a strong, preferably inorganic, base in the presence of water. The 1.4 - diamino - 2 - phenoxyanthraquinone-3-sulphonic acids easily obtainable in this manner already form in themselves, valuable and very fast acid dyestuffs for wool and in addition, the compounds constitute an excellent initial material for anthraquinone derivatives hitherto difficult to produce.

The following examples will further illustrate how the invention is carried out in practice, but the invention is not restricted thereto. The parts are by weight.

Example 1

50 parts of 1.4-diamino-2.3-dichloranthraquinone in a finely divided condition are boiled while stirring with 100 parts of phenol and 80 parts of neutral sodium sulphite in 950 parts of water, until the 1.4-diamino-2.3-dichloranthraquinone has almost completely dissolved to a blue-violet solution. The small residue is filtered by suction and the filtrate is acidified, the reaction product precipitating as fine, orange-yellow needles, which are isolated in the usual manner. In this way a good yield of 1.4-diamino-2-phenoxyanthraquinone-3-sulphonic acid is obtained as an orange yellow crystalline powder, which dissolves to a blue-violet solution in water. The solution in dilute caustic soda is also blue-violet, but turns to a handsome bluish-red on heating and saponifies to 1.4-diamino-2-hydroxyanthraquinone-3-sulphonic acid. The compound dissolves in concentrated sulphuric acid to a pale yellow solution, which turns greenish blue on addition of formaldehyde, and blue violet with boric acid. It gives very clear and fast blue-violet dyeings on wool from a faintly acid bath.

The sodium sulphite may be replaced by the methylamine salt of sulphurous acid. The homologues and substitution products of phenol react in a similar manner to phenol itself.

Example 2

5 parts of finely divided 1.4-diamino-2.3-dichlor-anthraquinone are heated to boiling for some time under atmospheric pressure with 15 parts of neutral sodium sulphite and 15 parts of m-cresol and 200 parts of water. The excess of m-cresol is then distilled off by means of steam, any unconverted initial material filtered off and the dyestuff salted out from the filtrate by means of common salt. The sodium salt of 1.4-diamino-2-cresoxy-anthraquinone-3-sulphonic acid forms small blue crystals and dyes wool violet blue shades from an acid bath.

Instead of m-cresol other alkylated phenols or halogen phenols may be employed. Also the dyestuffs produced from halogen phenols yield violet dyeings on wool.

What I claim is:—

1. Anthraquinone derivatives corresponding to the formula:

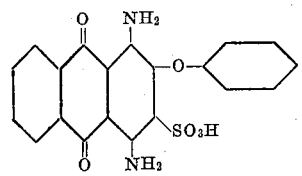

in which the benzene radicle may be substituted by alkyl radicles or halogen.

2. The anthraquinone derivative corresponding to the formula:

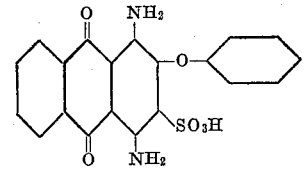

dyeing wool blue violet shades from a faintly acid bath.

3. The anthraquinone derivative corresponding to the formula:

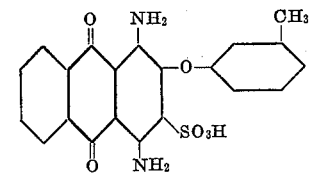

dyeing wool violet blue shades from a faintly acid bath.

BERTHOLD STEIN.